US009245587B2

(12) United States Patent
Chen et al.

(10) Patent No.: US 9,245,587 B2
(45) Date of Patent: Jan. 26, 2016

(54) SERVER DEVICE AND DATA STORAGE DEVICE REPLACEMENT MECHANISM THEREOF

(71) Applicant: Super Micro Computer Inc., San Jose, CA (US)

(72) Inventors: Richard S. Chen, San Jose, CA (US); Lawrence H. Liang, San Jose, CA (US); Lawrence K. W. Lam, San Jose, CA (US); Shen Ping, San Jose, CA (US)

(73) Assignee: SUPER MICRO COMPUTER INC., San Jose, CA (US)

( * ) Notice: Subject to any disclaimer, the term of this patent is extended or adjusted under 35 U.S.C. 154(b) by 110 days.

(21) Appl. No.: 13/938,463

(22) Filed: Jul. 10, 2013

(65) Prior Publication Data
US 2015/0016050 A1  Jan. 15, 2015

(51) Int. Cl.
   *G11B 33/12*   (2006.01)
   *G06F 1/18*    (2006.01)
(52) U.S. Cl.
   CPC .............. *G11B 33/128* (2013.01); *G06F 1/187* (2013.01)
(58) Field of Classification Search
   CPC ................ G11B 33/126–33/128; G06F 1/187
   USPC ......................................... 361/679.33, 679.37
   See application file for complete search history.

(56) References Cited

U.S. PATENT DOCUMENTS

| | | | | |
|---|---|---|---|---|
| 5,305,183 A * | 4/1994 | Teynor | ..................... | 361/679.55 |
| 6,392,884 B1 * | 5/2002 | Chou | ........................ | 361/679.33 |
| 6,560,107 B1 * | 5/2003 | Beck et al. | ..................... | 361/699 |
| 6,560,114 B2 * | 5/2003 | Berry et al. | ..................... | 361/727 |
| 6,621,693 B1 * | 9/2003 | Potter et al. | .............. | 361/679.33 |
| 6,816,368 B2 * | 11/2004 | Yokosawa | ................ | 361/679.33 |
| 6,853,548 B2 * | 2/2005 | Vanderheyden et al. | | 361/679.02 |
| 7,126,817 B2 * | 10/2006 | Li | ............................ | 361/679.37 |
| 7,362,565 B2 * | 4/2008 | Imblum | .................... | 361/679.33 |
| 7,515,410 B1 * | 4/2009 | Dingfelder et al. | ....... | 361/679.33 |
| 7,562,248 B2 * | 7/2009 | Topham | ....................... | 714/6.21 |
| 7,610,418 B2 * | 10/2009 | Holland et al. | ................. | 710/62 |
| 7,782,615 B1 * | 8/2010 | Hao-Der et al. | .............. | 361/695 |
| 7,903,401 B2 * | 3/2011 | Lee et al. | ................. | 361/679.33 |
| 7,983,032 B2 * | 7/2011 | Walker et al. | ............. | 361/679.33 |
| 7,995,336 B2 * | 8/2011 | Tang et al. | ............... | 361/679.33 |
| 8,300,400 B2 * | 10/2012 | Sun | ........................ | 361/679.37 |
| 8,508,928 B2 * | 8/2013 | Killen et al. | ............. | 361/679.33 |
| 2004/0023522 A1 * | 2/2004 | Chang | ............................. | 439/43 |
| 2004/0181388 A1 * | 9/2004 | Yip et al. | ........................ | 703/25 |
| 2005/0257232 A1 * | 11/2005 | Hidaka | ......................... | 720/654 |
| 2006/0002077 A1 * | 1/2006 | Carlson et al. | ................ | 361/685 |

(Continued)

*Primary Examiner* — Adrian S Wilson
(74) *Attorney, Agent, or Firm* — Chun-Ming Shih; HDLS IPR Services (57) ABSTRACT

A server device has a case, a backplane board mounted inside the case, a plurality of data storage device replacement mechanisms inserted inside the case, a plurality of first data storage devices and a plurality of second data storage devices. The data storage device replacement mechanism includes a tray, a connector assembly and a circuit board. The connector assembly is disposed inside an accommodation space of the tray and includes a first connector and a second connector. The circuit board is installed inside a second arrangement area of the tray and electrically connected to the first connector, the second connector and the backplane board. The first data storage device is arranged inside a first arrangement area of the tray and electrically connected to the first connector. The second data storage device is arranged inside the second arrangement area of the tray and electrically connected to the second connector.

10 Claims, 6 Drawing Sheets

(56) References Cited

U.S. PATENT DOCUMENTS

| | | |
|---|---|---|
| 2006/0023416 A1* | 2/2006 | Chen .............................. 361/685 |
| 2006/0050487 A1* | 3/2006 | Wu et al. ....................... 361/724 |
| 2006/0061955 A1* | 3/2006 | Imblum ......................... 361/685 |
| 2006/0250766 A1* | 11/2006 | Blaalid et al. ................. 361/685 |
| 2007/0233781 A1* | 10/2007 | Starr et al. .................... 709/203 |
| 2007/0247805 A1* | 10/2007 | Fujie et al. .................... 361/687 |
| 2008/0298014 A1* | 12/2008 | Franco .......................... 361/688 |
| 2009/0002934 A1* | 1/2009 | Carlson et al. ................ 361/684 |
| 2009/0271551 A1* | 10/2009 | Cheng ........................... 710/301 |
| 2010/0271766 A1* | 10/2010 | Lin ............................... 361/679.02 |
| 2011/0267761 A1* | 11/2011 | Peng et al. .................... 361/679.31 |
| 2012/0106070 A1* | 5/2012 | Landon ......................... 361/679.47 |

* cited by examiner

SERVER DEVICE AND DATA STORAGE DEVICE REPLACEMENT MECHANISM THEREOF

BACKGROUND OF THE INVENTION

1. Field of the Invention

The present invention relates to a server device, in particular, to a server device and a hard disc data storage device replacement mechanism thereof.

2. Description of Related Art

A server device has a wide using range. A place where Internet is necessary for signal data transmission needs the server device as a relay station to transmit data. The server device has a plurality of data storage devices (e.g. hard disk drives) mounted therein for accessing a large number of signal data.

A traditional server device comprises a case, a mother board, a backplane board, a plurality of trays, and a plurality of hard disk drives. The backplane board is disposed inside the case and coupled to the mother board and the hard disk drives with the trays. The tray is inserted inside the case. Each hard disk drive is mounted inside each tray and electrically connected to the backplane board. And the backplane board is electrically connected to the mother board for the server device to access a large number of signal data.

The traditional server device has the following disadvantages. Each tray merely can accommodate one hard disk drive. However, if the amount of the hard disk drive needs to be increased, the tray has to be increased in the same amount. In this case, the height and width of the server device have to be increased to accommodate the increasing structures of the tray. That is, it will occupy more space in the server device and less room for other components. Furthermore, more structure of the trays will increase the total weight and the material cost of the server device.

SUMMARY OF THE INVENTION

The present invention is to provide a server device having a connector assembly disposed inside an accommodation space, such that a data storage device replacement mechanism can support a plurality of data storage devices inside a case, so as to accommodate more data storage devices inside the case in the condition of same height and width, and to decrease occupied space of the server device.

In order to achieve the above-mentioned objective, the present invention provides a server device comprising a case, a backplane board, a plurality of data storage device replacement mechanisms, a plurality of first data storage devices and a plurality of second data storage devices. The backplane board is mounted inside the case. The data storage device replacement mechanism is inserted inside the case. The data storage device replacement mechanism includes a tray, a connector assembly and a circuit board. The tray has an accommodation space. The connector assembly is disposed inside the accommodation space and separates the accommodation space into a first arrangement area and a second arrangement area, the connector assembly includes a first connector disposed toward the first arrangement area and a second connector disposed toward the second arrangement area, and the second connector is located beside the first connector and offsets relative to the first connector. The circuit board is installed inside the second arrangement area and electrically connected to the first connector, the second connector and the backplane board. The first data storage device is arranged inside the first arrangement area and electrically connected to the first connector. The second data storage device is arranged inside the second arrangement area and electrically connected to the second connector.

In order to achieve the above-mentioned objective, the present invention further provides a data storage device replacement mechanism for a server device comprising a tray, a connector assembly and a circuit board. The tray has an accommodation space. The connector assembly is disposed inside the accommodation space and separates the accommodation space into a first arrangement area and a second arrangement area, the connector assembly includes a first connector disposed toward the first arrangement area and a second connector disposed toward the second arrangement area, and the second connector is located beside the first connector and offsets relative to the first connector. The circuit board is installed inside the second arrangement area and electrically connected to the first connector and the second connector.

The present invention has the following advantages. First, the connector assembly is disposed inside the accommodation space of the tray, and the first connector offsets relative to the second connector, such that the circuit board is necessarily disposed inside the second arrangement area of the tray, so as to decrease material cost of the circuit board. Second, the first connector offsets relative to the second connector, such that the first connector and the second connector occupy less volume in the accommodation space of the tray. Third, the supporting board is disposed inside the first arrangement area of the tray, so as to enhance structural strength of the tray to support the first data storage device. Fourth, the tray is inserted inside the case, so as to achieve convenient maintenance of the data storage device. Fifth, the data storage device supporting frame corresponds to the opening and traverses atop the case, and then the operation data storage device is mounted on the supporting frame, so as to achieve more effective space utilization.

DETAILED DESCRIPTION OF THE INVENTION

The detailed description and the technical content of the present invention are illustrated with the accompanied drawings as follows. The accompanied drawings merely provide reference and description instead of a limit to the present invention.

Figure 1:
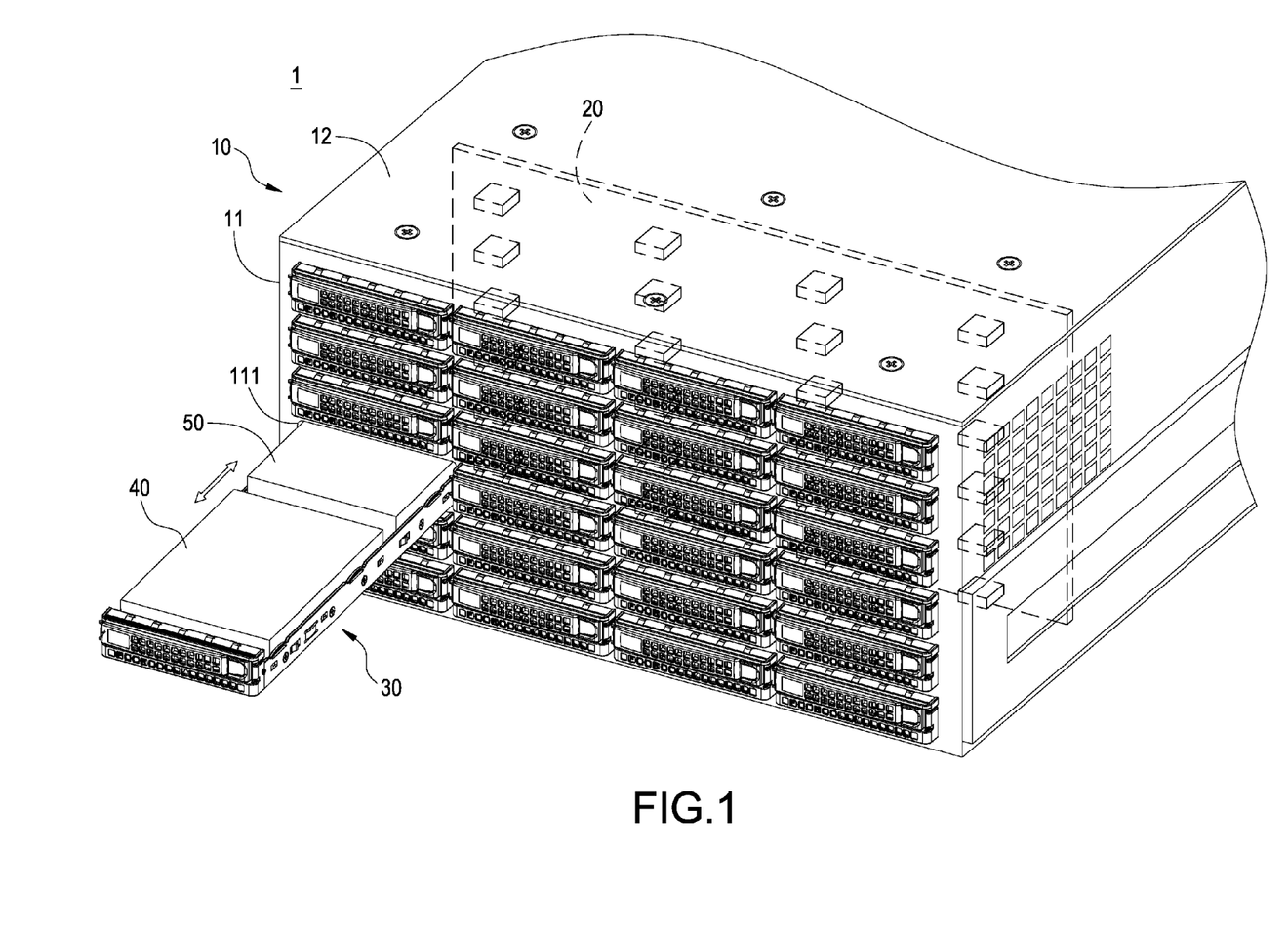
FIG. 1 is a perspective view according to the present invention.
Figure 2:
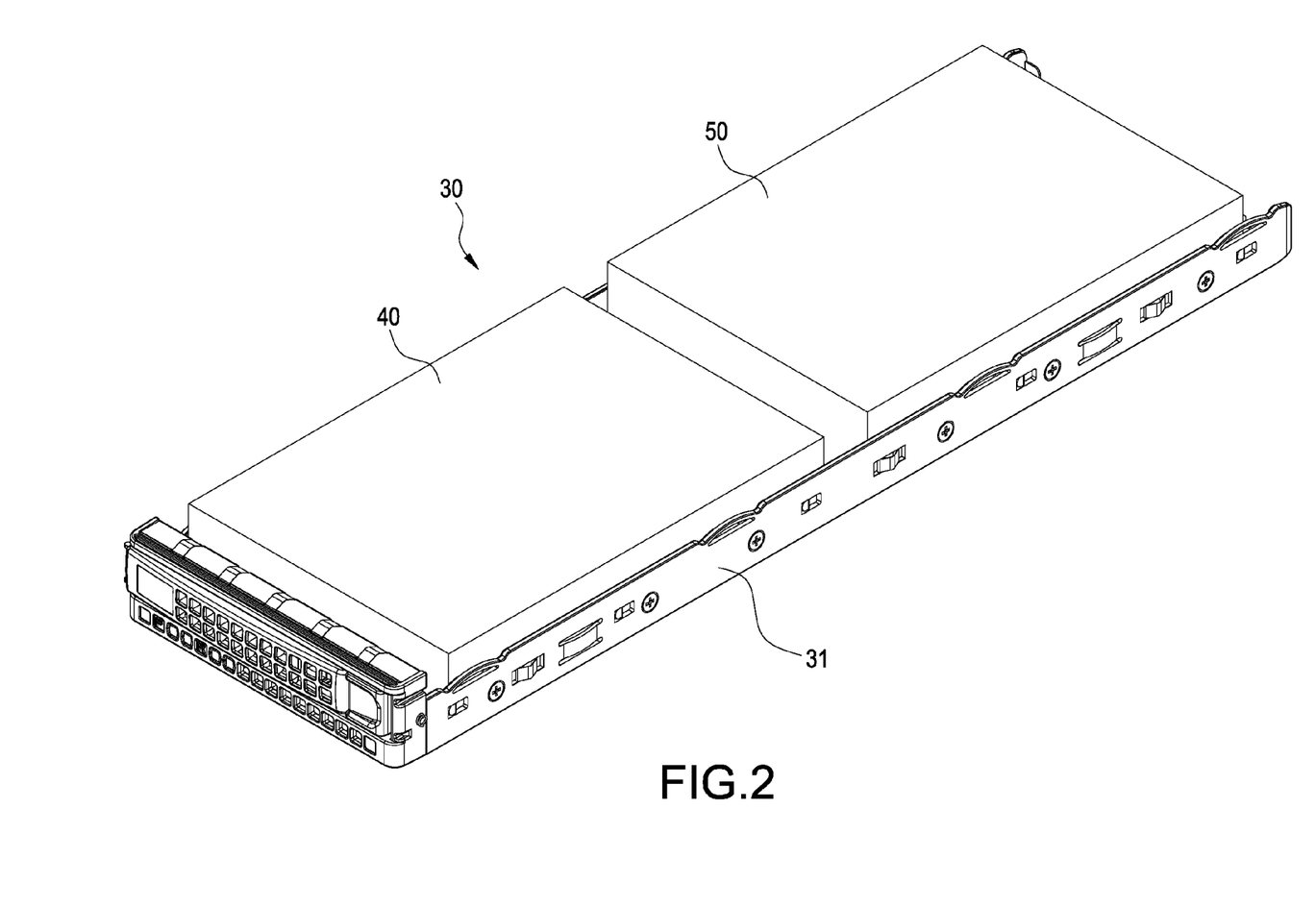
FIG. 2 is a schematic view of a data storage device replacement mechanism according to the present invention.
Figure 3:
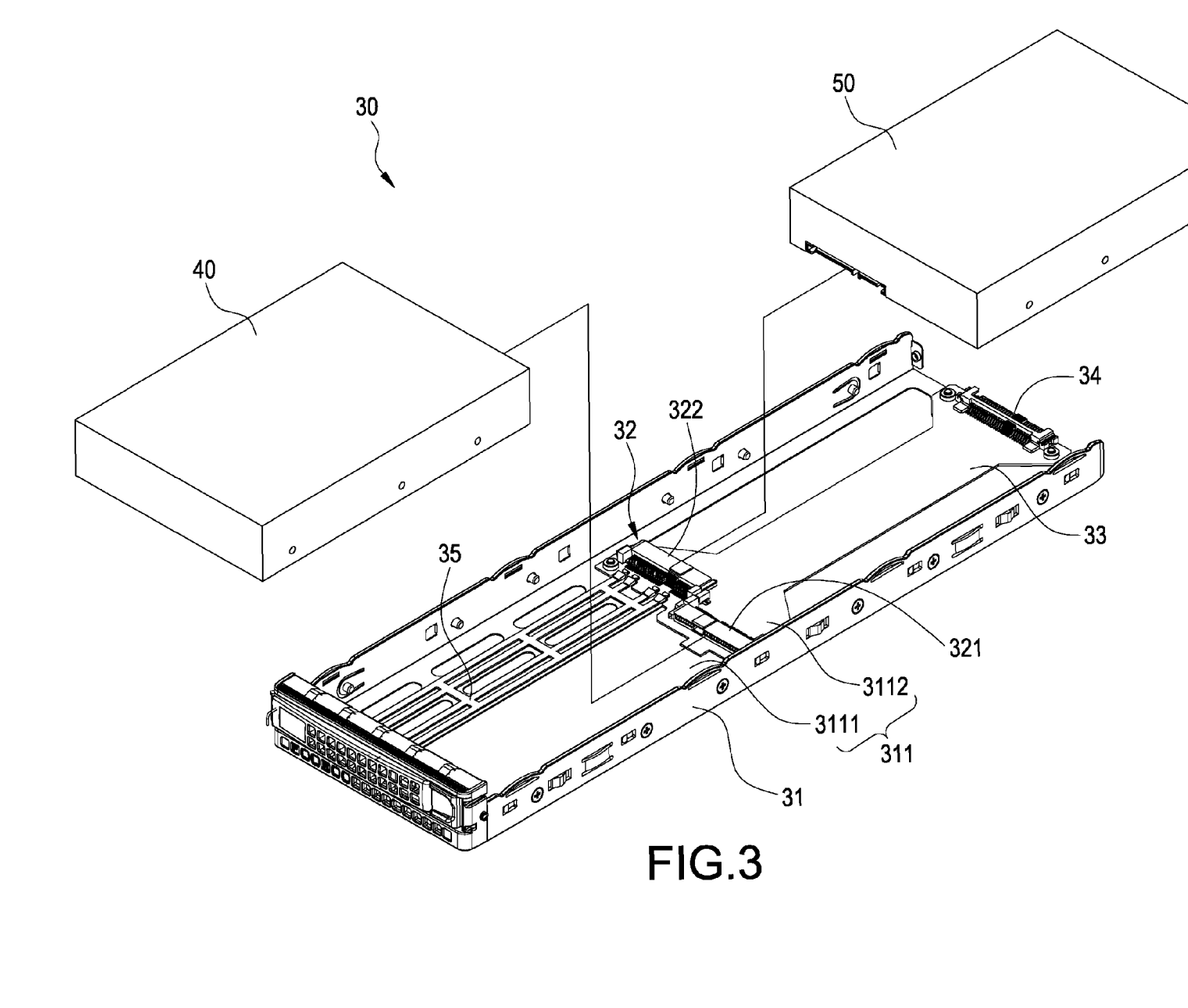
FIG. 3 is an explosion view of the data storage device replacement mechanism according to the present invention.

Please refer to FIGS. 1-3, which are a perspective view according to the present invention, a schematic view of a data storage device replacement mechanism according to the present invention and an explosion view of the data storage device replacement mechanism according to the present invention. The present invention provides a server device 1 comprising a case 10, a backplane board 20, a plurality of data storage device replacement mechanisms 30, a plurality of first data storage devices 40 and a plurality of second data storage devices 50. Please note that, the first data storage devices 40 and the second storage devices 50 can be embodied by the well-known hard disk drives (HDD), or other storage devices with same or similar data storage functionality, such as solid-state drives (SDD), or flash drives. These are only examples of the first data storage devices 40 and the second storage devices 50, and are not meant to be taken as limitation.

The case 10 includes a housing 11 and a covering board 12. The housing 11 has an accommodation chamber and a plurality of sockets 111. The sockets 111 are formed on two opposite sides of the housing 11 and communicated with the accommodation chamber. The sockets 111 are in stack configuration. The covering board 12 corresponds to the opening and covers the housing 11.

The backplane board 20 is mounted inside the accommodation chamber of the case 10, and the backplane board 20 is correspondingly arranged to the sockets 111 of the housing 11. The backplane board 20 is electrically connected to a mother board (Not shown in Figure). Please note that, the backplane board 20 is used to control and communicate the first data storage devices 40 and the second storage devices 50 with the mother board of the server device 1. The backplane board 20 can be implemented with HDD controller IC, data storage controller IC, or HDD expender IC. It is a common practice in the computer or server application fields, to adopt the backplane board 20 as a control or communication backplane for multiple data storage devices, and thus the configuration and operation of the backplane board 20 are considered well known to those skilled in the art.

The data storage device replacement mechanism 30 is inserted inside the socket 111 of the case 10. Furthermore, please refer to FIG. 3. The data storage device replacement mechanism 30 includes a tray 31, a connector assembly 32, a circuit board 33, a third connector 34 and a supporting board 35. It should also be noted that, the data storage device replacement mechanisms 30 can be inserted inside the housing 11 of the case 10 from two opposite sides of the case 10 to extend the storage space of the server device 1 (i.e. to extend the maximum number of the first data storage devices 40 and the second storage devices 50 in the server device 1).

The tray 31 has an accommodation space 311. The connector assembly 32 is disposed inside the accommodation space 311 of the tray 31 and separates the accommodation space 311 into a first arrangement area 3111 and a second arrangement area 3112. The connector assembly 32 includes a first connector 321 and a second connector 322. The first connector 321 is disposed toward the first arrangement area 3111. The second connector 322 is disposed toward the second arrangement area 3112. The second connector 322 is located beside the first connector 321. The first connector 321 offsets relative to the second connector 322. Each of the second connectors 322 is located beside each of the first connectors 321. Each of the first connectors 321 offsets relative to each of the second connectors 322.

The circuit board 33 is installed inside the second arrangement area 3112 of the tray and electrically connected to the first connector 321 and the second connector 322. The third connector 34 is arranged inside the second arrangement area 3112 and spaced away from the first arrangement area 3111. The third connector 34 is electrically connected to the backplane board 20 and the circuit board 33. The supporting board 35 is installed inside the first arrangement area 3111 and connected to the circuit board 33.

The first data storage device 40 is arranged inside the first arrangement area 3111 and electrically connected to the first connector 321. The supporting board 35 is clipped between the first data storage device 40 and the tray 31. As mentioned, the first data storage device 40 is utilized to store the signal data received by the server device 1.

The second data storage device 50 is arranged inside the second arrangement area 3112 and electrically connected to the second connector 322. The circuit board 33 is clipped between the second data storage device 50 and the tray 31. Same as above, the second data storage device 50 is utilized to store the signal data received by the server device 1.

In addition, since the first data storage device 40 is electrically connected to the circuit board 33 via the first connector 321, and the second data storage device 50 is electrically connected to circuit board 33 via the second connector 322, signal data in the first connector 321 and the second connector 322 can be transmitted to the circuit board 33 via the first connector 321 and the second connector 322, respectively, and transmitted to the backplane board 20 via the third connector 34.

Figure 4:
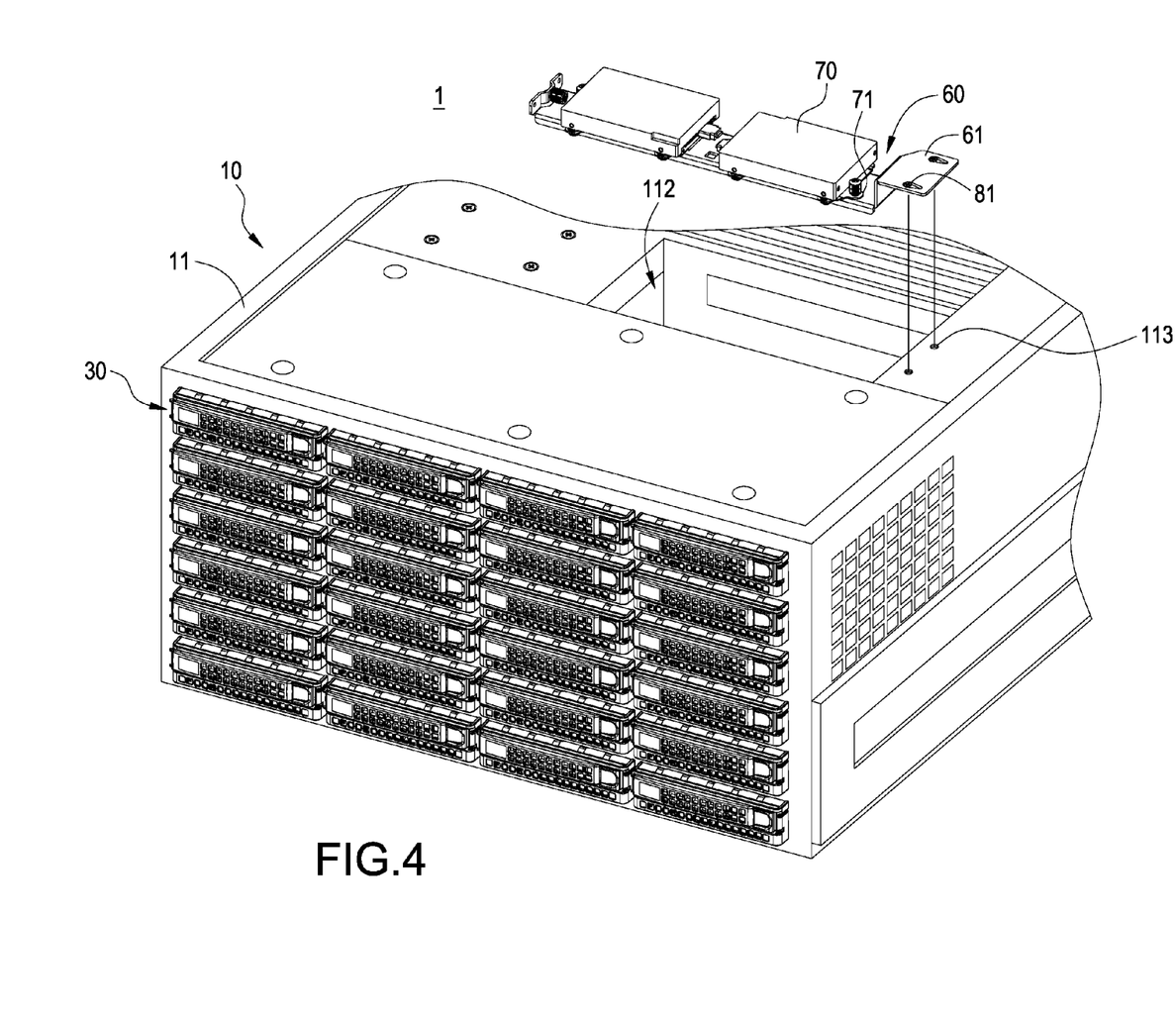
FIG. 4 is a perspective assembly view according to the present invention.
Figure 5:
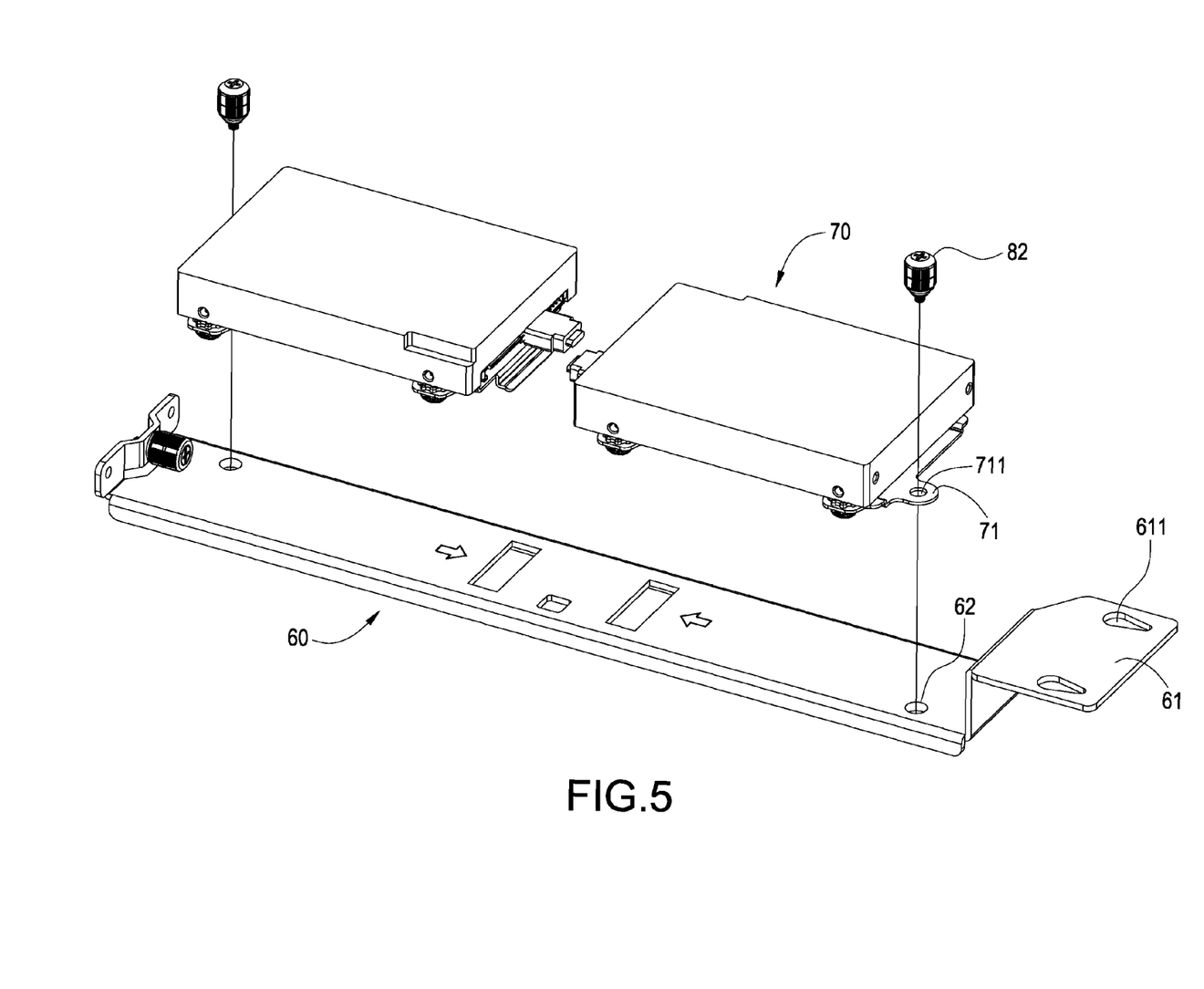
FIG. 5 is a schematically perspective view according to the present invention.

Please refer to FIGS. 4 and 5, which are a perspective assembly view and a schematically perspective view according to the present invention, the housing 11 has an opening 112 formed on an upper portion thereof. The opening 112 has two side edges. The side edge has at least one threaded hole 113. The server device further comprises a supporting frame 60, at least an operation system (OS) storage devices 70, a plurality of securing members 81 and a plurality of locking members 82.

The supporting frame 60 has two folding edges 61 extending and bending from two sides thereof. The folding edge 61 has at least one penetrating hole 611 corresponding to the threaded hole 113. The supporting frame 60 corresponds to the opening 112 of the housing 11 and traverses atop the housing 11. The two folding edges 61 are connected to two side edges of the opening 112 of the housing 11. The securing member 81 passes through the penetrating hole 611 and is fixed to the threaded hole 113. Further, the supporting frame 60 has a plurality of fixing holes 62.

The operation system (OS) storage devices 70 is intervally mounted on the supporting frame 60 and electrically connected to the backplane board 20. The OS storage device 70 has a flange 71 formed on a side thereof. The flange 71 has a piercing hole 711 corresponding to the fixing hole 62. The locking member 82 passes through the piercing hole 711 and is fixed to the fixing hole 62. The operation system (OS) storage device 70 is utilized to store the operation system data for the server device 1, such as Linux, DOS, or other computer or server operation systems.

Figure 6:
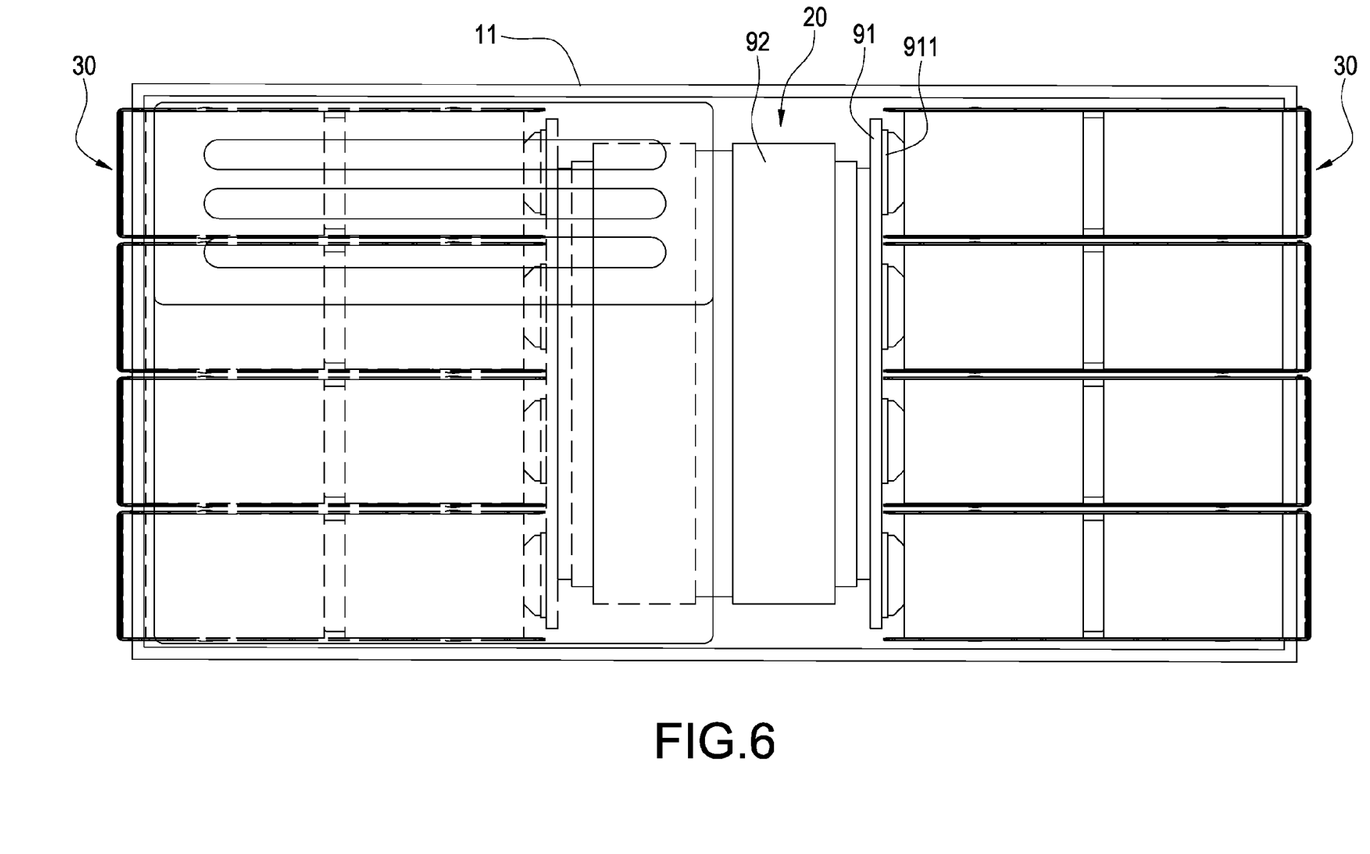
FIG. 6 is a schematic operation view according to the present invention.

Please refer to FIG. 6, which is a schematic operation view according to the present invention, the server device 1 further comprises two backplane board 20. The two backplane board 20 are mounted inside the housing 11 and located between the mother board and the data storage device replacement mechanism 30. The backplane board 20 are adjacent to each other. The backplane board 20 includes a connection board 91 and a control board 92. The connection board 91 has a plurality of connection ports 911. The third connector 34 is electrically connected to the plurality of connection ports 911. The plurality of connection ports 911 is electrically connected to the backplane board 20. The control board 92 is electrically connected to the connection board 91 and electrically connected to the mother board.

Therefore, the data storage device replacement mechanisms 30 can be inserted inside the housing 11 of the case 10 from two opposite sides of the case 10, the mother board is located above the data storage device replacement mechanisms 30 inserted from one side of the housing, and the first data storage devices 40 and the second storage devices 50 are located on a side of the mother board and electrically connected to the connection port 911 via the third connector 34 of the data storage device replacement mechanism 30, such that signal data in the first data storage device 40 and the second data storage device 50 is processed by the control board 92 and then transmitted to the mother board. On the other hand, the signal data processed by the mother board can be converted by the control board 92 and then transmitted to the backplane board 20 and to the first data storage device 40 and the second data storage device 50, so as to achieve optimum space utilization performance. Accordingly, the connector assembly 32 is disposed inside the accommodation space 311 of the tray 31, and the first connector 321 offsets relative to the second connector 322, such that the circuit board 33 is disposed inside the second arrangement area 3112 of the tray 31 rather than inside the first arrangement area 3111 of the tray 31, so as to decrease occupied area and volume of circuit board 33 and to decrease material cost of the circuit board 33, in order to achieve cost down effect.

Moreover, since the first connector 321 offsets relative to the second connector 322, it can decrease occupied volume of the first connector 321 and the second connector 322 inside the accommodation space 311 of the tray 31. Accordingly, it can decrease occupied volume of the tray 31, so as to decrease occupied space of the server device 1, in order to achieve save space.

Furthermore, the first data storage device 40 and the second data storage device 50 are arranged inside the first arrangement area 3111 and the second arrangement area 3112 of the tray 31, such that the data storage device replacement mechanism 30 can accommodate a plurality of data storage devices simultaneously. Accordingly, the data storage device replacement mechanism 30 can insert the plurality of data storage devices into the case 10. Hence, in the condition of same height and width, the case 10 can accommodate more data storage devices, so as to achieve effective space utilization. In addition, it can increase storage volume of signal data in the server device 1.

Further, the supporting board 35 is disposed inside the first arrangement area 3111 of the tray 31, so as to enhance structural strength of the tray 31 to support the first data storage device 40.

Also, since the tray 31 is inserted inside the housing 11, when the first data storage device 40 or the second data storage device 50 break down, the tray 31 can be pulled out of the housing 11, and a new first data storage device 40 or a new second data storage device 50 is replaced, then the tray 31 is inserted into the housing 11 again, so as to achieve convenient maintenance.

In addition, the supporting frame 60 corresponds to the opening 112 and traverses atop the housing 11, and then the operation data storage device 70 is mounted on the supporting frame 60, such that The operation system (OS) storage device 70 is supported atop the housing 11 by the supporting frame 60. Accordingly, it can achieve more effective space utilization.

In conclusion, the server device and the data storage device replacement mechanism thereof according to the present invention have industrial applicability, novelty and non-obviousness. The present invention is neither disclosed by similar products nor used in public, and totally complies with requirements for the application of a Utility Model patent, such that an application is filed pursuant to the Patent Law.

What is claimed is:

1. A server device comprising:
    a case;
    at least a backplane board mounted inside the case;
    a plurality of data storage device replacement mechanisms inserted inside the case, the data storage device replacement mechanism including:
    a tray having an accommodation space;
    a connector assembly disposed inside the accommodation space and separating the accommodation space into a first arrangement area and a second arrangement area, the connector assembly including a first connector disposed toward the first arrangement area and a second connector disposed toward the second arrangement area so that an opening direction of the first connector is opposite to that of the second connector, the second connector being adjacent to the first connector and misaligning to the first connector so that the first connector and the second connector are disposed between the first arrangement area and the second arrangement area; and
    a single circuit board installed inside the second arrangement area and electrically connected to the first connector, the second connector and the backplane board, wherein the first connector and the second connector are disposed on a top surface of the circuit board;
    a plurality of first data storage devices, the first data storage device being arranged inside the first arrangement area and electrically connected to the first connector; and
    a plurality of second data storage devices, the second data storage device being arranged inside the second arrangement area and electrically connected to the second connector;
    wherein there are two backplane boards mounted inside the case, the storage device replacement mechanisms can be inserted from two opposite sides of the case, a third connector disposed on the top surface of the circuit board and inside the second arrangement area is electrically connected to a mother board by being electrically connected to the circuit board, the backplane board, and an electrical connection component, and each of the two backplane boards is located between the mother board and the data storage device replacement mechanisms;
    wherein each of the two backplane boards includes a connection board and a control board, the third connector is electrically connected to the connection board, and the control board is electrically connected to the mother board and the connection board;
    wherein the first connector and the second connector are respectively disposed at two sides of a longitudinal axis (L) of the circuit board and arranged along a transversal axis, a location of the second connector's connection with the second data storage devices, with respect to the transversal axis, is opposite to that of the first connector's connection with the first data storage device; and
    since the first data storage device is electrically connected to the circuit board via the first connector, and the second data storage device is electrically connected to the circuit board via the second connector, signal data in the first connector and the second connector can be transmitted to the circuit board via the first connector and the second connector, respectively, and transmitted to the backplane board via the third connector.

2. The server device of claim 1, wherein the connection board has a plurality of connection ports, and the third connector is electrically connected to the connection port.

3. The server device of claim 1, wherein the data storage device replacement mechanism further includes a supporting board, the circuit board is clipped between the second data storage device and the tray, the supporting board is installed inside the first arrangement area and connected to the circuit board, and the supporting board is clipped between the first data storage device and the tray.

4. The server device of claim 1, wherein the case has a plurality of sockets in stack configuration formed on a side thereof, and the data storage device replacement mechanism is inserted inside the socket.

5. The server device of claim 1, further comprising a supporting frame and at least an operation system storage device, the case having an opening formed on an upper portion thereof, the supporting frame corresponding to the opening and traversing atop the case, the operation system storage device being intervally mounted on the supporting frame and electrically connected to the mother board.

6. The server device of claim 5, wherein the supporting frame has two folding edges extending and bending from two sides thereof, respectively, and the folding edge is connected to a side edge of the opening.

7. The server device of claim 6, further comprising a plurality of securing members, the side edge of the opening having at least one threaded hole, the folding edge having at least one penetrating hole corresponding to the at least one threaded hole, the securing member passing through the penetrating hole and being fixed to the threaded hole.

8. The server device of claim 5, further comprising a plurality of locking members, the supporting frame having a plurality of fixing holes, the operation system storage device having a flange formed on a side thereof, the flange having a piercing hole correspond to the fixing hole, the locking member passing through the piercing hole and being fixed to the fixing hole.

9. A data storage device replacement mechanism for a server device comprising:
 a tray having an accommodation space;
 a connector assembly disposed inside the accommodation space and separating the accommodation space into a first arrangement area and a second arrangement area, the connector assembly including a first connector disposed toward the first arrangement area and a second connector disposed toward the second arrangement area so that an opening direction of the first connector is opposite to that of the second connector, the second connector being adjacent to the first connector and misaligning to the first connector so that the first connector and the second connector are disposed between the first arrangement area and the second arrangement area; and
 a single circuit board installed inside the second arrangement area and electrically connected to the first connector and the second connector,
 wherein the first connector and the second connector are disposed on a top surface of the circuit board;
 wherein there are two backplane boards mounted inside the case, the storage device replacement mechanisms can be inserted from two opposite sides of the case, a third connector disposed on the top surface of the circuit board and inside the second arrangement area is electrically connected to a mother board by being electrically connected to the circuit board, the backplane board, and an electrical connection component, and each of the two backplane boards is located between the mother board and the data storage device replacement mechanisms;
 wherein each of the two backplane boards includes a connection board and a control board, the third connector is electrically connected to the connection board, and the control board is electrically connected to the mother board and the connection board;
 wherein the first connector and the second connector are respectively disposed at two sides of a longitudinal axis (L) of the circuit board and arranged along a transversal axis, a location of the second connector's connection with the second data storage devices, with respect to the transversal axis, is opposite to that of the first connector's connection with the first data storage device; and
 since the first data storage device is electrically connected to the circuit board via the first connector, and the second data storage device is electrically connected to the circuit board via the second connector, signal data in the first connector and the second connector can be transmitted to the circuit board via the first connector and the second connector, respectively, and transmitted to the backplane board via the third connector.

10. The data storage device replacement mechanism of claim 9, wherein the data storage device replacement mechanism further includes a supporting board installed inside the first arrangement area and connected to the circuit board.

* * * * *